United States Patent
Wu et al.

(10) Patent No.: US 12,236,692 B2
(45) Date of Patent: Feb. 25, 2025

(54) DRIVER ATTENTION DETECTION METHOD

(71) Applicant: SHENZHEN YINWANG INTELLIGENT TECHNOLOGIES CO., LTD., Shenzhen (CN)

(72) Inventors: Yitian Wu, Plano, TX (US); Fatih Murat Porikli, Plano, TX (US); Lei Yang, Plano, TX (US); Yuan Ma, Plano, TX (US)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 443 days.

(21) Appl. No.: 17/338,390

(22) Filed: Jun. 3, 2021

(65) Prior Publication Data

US 2021/0357670 A1 Nov. 18, 2021

Related U.S. Application Data

(63) Continuation of application No. PCT/US2019/036366, filed on Jun. 10, 2019.

(51) Int. Cl.
*G06V 20/59* (2022.01)
*G06T 7/70* (2017.01)
(Continued)

(52) U.S. Cl.
CPC .............. *G06V 20/597* (2022.01); *G06T 7/70* (2017.01); *G06V 10/82* (2022.01); *G06V 20/58* (2022.01); *G06T 2207/20084* (2013.01)

(58) Field of Classification Search
None
See application file for complete search history.

(56) References Cited

U.S. PATENT DOCUMENTS

| 8,264,531 B2 | 9/2012 | Jung et al. |
| 10,929,715 B2 * | 2/2021 | Chinni ................. G05D 1/0221 |

(Continued)

FOREIGN PATENT DOCUMENTS

| JP | 2004178367 A | 6/2004 |
| JP | 2005267108 A | 9/2005 |
| WO | 2018066712 A1 | 4/2018 |

OTHER PUBLICATIONS

"Toyota Patents Eyelid-Tracking Feature to Detect Driver Distraction," retrieved from the internet: http://www.crowntoyotadecatur.com/blog/2015/april/23/toyota-patents-eyelid-tracking-feature-to-detect-driver-distraction.htm, Jan. 24, 2022, 1 page.

(Continued)

*Primary Examiner* — Bernard Krasnic
(74) *Attorney, Agent, or Firm* — Conley Rose, P.C.

(57) ABSTRACT

The disclosure relates to technology for monitoring driver attentiveness in a vehicle. A driver distraction system collects vehicle data and scene information from the vehicle while traveling on a route. The vehicle data and scene information are then processed to generate a reference heat map. At the same time, the driver distraction system may capture a gaze of a driver to track a gaze direction and duration of the driver while driving the vehicle on the route. The gaze direction and duration are processed to generate a driver gaze heat map. The driver gaze heat map and reference heat map are analyzed to determine a level of driver distraction of the driver in the vehicle, and a recommendation or warning is output to the driver of the vehicle according to the level of driver distraction.

18 Claims, 10 Drawing Sheets

(51) Int. Cl.
*G06V 10/82* (2022.01)
*G06V 20/58* (2022.01)

(56) References Cited

U.S. PATENT DOCUMENTS

| | | |
|---|---|---|
| 2005/0209749 A1 | 9/2005 | Ito et al. |
| 2015/0339589 A1 | 11/2015 | Fisher |
| 2018/0260415 A1* | 9/2018 | Gordo Soldevila ........................ G06F 16/5838 |
| 2019/0197323 A1 | 6/2019 | Sakal et al. |
| 2019/0332931 A1* | 10/2019 | Montantes .............. G06F 40/40 |
| 2020/0379460 A1* | 12/2020 | Stent ...................... G06V 10/82 |

OTHER PUBLICATIONS

"Distracted Driving," https://www.nhtsa.gov/risky-driving/distracted-driving, retrieved from the internet: https://www.nhtsa.gov/risky-driving/distracted-driving, Jan. 24, 2022, 8 pages.

* cited by examiner

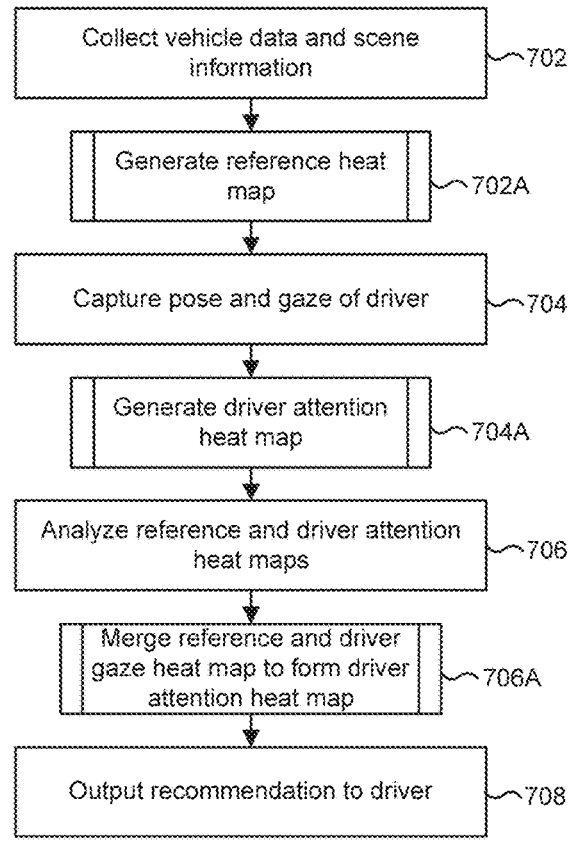
FIG. 7A
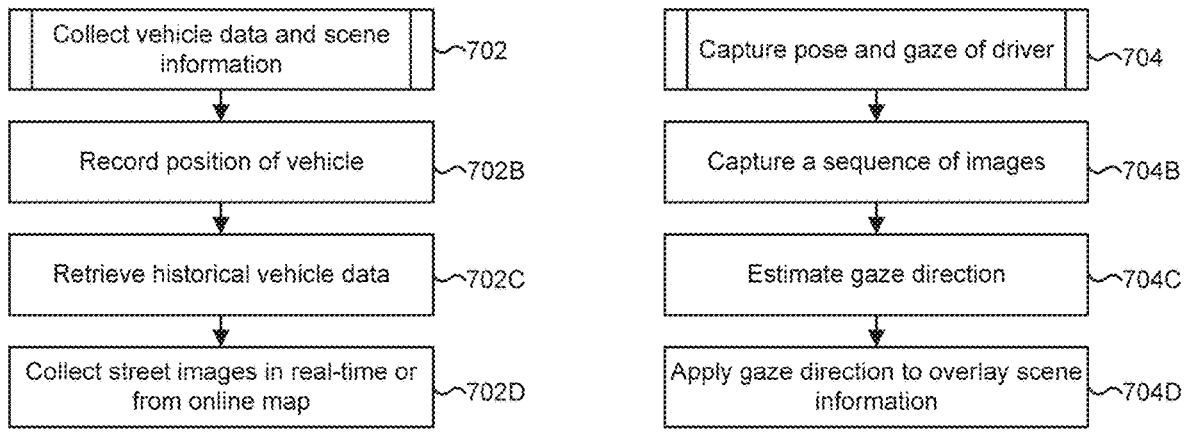
FIG. 7B  FIG. 7C

DRIVER ATTENTION DETECTION METHOD

CROSS-REFERENCE TO RELATED APPLICATIONS

This application is a continuation of International Application No. PCT/US2019/036366 filed on Jun. 10, 2019, by Futurewei Technologies, Inc., and titled "Driver Attention Detection Method," which is hereby incorporated by reference.

TECHNICAL FIELD

The disclosure generally relates to driver distraction, and in particular, to monitoring driver attentiveness while driving a vehicle.

BACKGROUND

Driver distraction is increasingly becoming a leading cause of vehicular accidents, particularly with the increased use of technology such as mobile devices, which divert the driver's attention away from the road. Driver distraction monitoring and avoidance is critical in assuring a safe driving environment not only for the distracted driver, but also for other drivers in the vicinity that may be affected by the distracted driver. Vehicles with the ability to monitor a driver allow for measures to be taken by the vehicle to prevent or assist in preventing accidents as a result of the driver being distracted. For instance, warning systems can be enabled to alert the driver that she is distracted or automatic features, such as braking and steering, may be enabled to bring the vehicle under control until such time the driver is no longer distracted. To detect driver distraction, these warning and preventative monitoring systems may use head pose and gaze angles of a driver to evaluate the current status. However, such systems will typically analyze the data on a frame-by-frame basis and often fail to consider other information, such as road conditions, driver intention, etc.

SUMMARY

According to one aspect of the present disclosure, there is a computer-implemented method for monitoring driver attentiveness in a vehicle, comprising collecting vehicle data and scene information from the vehicle while traveling on a route, the vehicle data and scene information processed to generate a reference heat map, and capturing a gaze of a driver to track a gaze direction and duration of the driver while driving the vehicle on the route, the gaze direction and duration processed to generate a driver gaze heat map; and analyzing the driver gaze heat map and the reference heat map to determine a level of driver distraction of the driver in the vehicle, and outputting a recommendation to the driver of the vehicle according to the level of driver distraction.

Optionally, in any of the preceding aspects, further comprising generating the reference heat map from the scene information and the vehicle data using a convolutional neural network (CNN) that comprises one or more convolutional layers and at least one fully-connected layer, wherein the reference heat map identifies one or more regions in the scene information requiring driver attention for safe driving; and generating the driver gaze heat map based on the gaze direction and duration of the driver while driving the vehicle, wherein the driver gaze heat map identifies one or more zones in the scene information viewed by the driver during the duration.

Optionally, in any of the preceding aspects, wherein tracking the gaze direction and duration comprises capturing, by the one or more sensors, a sequence of images of the driver over the duration; estimating the gaze direction of the driver based on the gaze extracted from the sequence of images; and applying the gaze direction to overlay the scene information to form the driver gaze heat map.

Optionally, in any of the preceding aspects, wherein collecting the vehicle data includes recording a position of the vehicle during driving on the route and retrieving historical vehicle data from a database that is representative of the vehicle data over a predetermined period; and collecting the scene information includes obtaining street images in real-time from the one or more sensors or an online map.

Optionally, in any of the preceding aspects, wherein the vehicle data includes at least one of vehicle speed data, turn indication data, light condition data, brake usage data, steering wheel usage data, global positioning system (GPS) data, gas pedal usage data, and navigation route data; and the scene information includes at least one of scene images, online street maps, radar maps, weather, traffic and road conditions.

Optionally, in any of the preceding aspects, further comprising merging the reference heat map with the driver gaze heat map to form a driver gaze heat map, where the driver attention heat map is determinative of whether the level of driver distraction meets or exceeds a threshold attentiveness level.

Optionally, in any of the preceding aspects, wherein, when the threshold is met or exceeded, the recommendation is a warning to focus the gaze direction of the driver on one or more regions of the driver gaze heat map based on values associated with each of the one or more regions, where the values represent a level of attention required by the driver for each of the one or more regions.

Optionally, in any of the preceding aspects, wherein the one or more processors are located in the vehicle or communicatively coupled to the vehicle.

According to one other aspect of the present disclosure, there is provided a system for monitoring driver attentiveness in a vehicle, comprising one or more vehicle sensors configured to collect vehicle data and scene information from the vehicle while traveling on a route, the vehicle data and scene information processed to generate a reference heat map, and capture a gaze of a driver to track a gaze direction and duration of the driver while driving the vehicle on the route, the gaze direction and duration processed to generate a driver gaze heat map; and one or more processors configured to analyze the driver gaze heat map and the reference heat map to determine a level of driver distraction of the driver in the vehicle, and output a recommendation to the driver of the vehicle according to the level of driver distraction.

According to still one other aspect of the present disclosure, there is a non-transitory computer-readable medium storing computer instructions for monitoring driver attentiveness in a vehicle, that when executed by one or more processors, cause the one or more processors to perform the steps of collecting vehicle data and scene information from the vehicle while traveling on a route, the vehicle data and scene information processed to generate a reference heat map, and capturing a gaze of a driver to track a gaze direction and duration of the driver while driving the vehicle on the route, the gaze direction and duration processed to generate a driver gaze heat map; and analyzing the driver gaze heat map and the reference heat map to determine a level of driver distraction of the driver in the vehicle, and outputting a recommendation to the driver of the vehicle according to the level of driver distraction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 7A-7C illustrate example flow diagrams for monitoring driver attentiveness in a vehicle in accordance with embodiments of the disclosure.

DETAILED DESCRIPTION

The present disclosure will now be described with reference to the figures, which in general relate to a driver attention detection.

The technology relates to monitoring driver attentiveness while driving a vehicle so as to avoid or reduce driver distraction. Scene information and vehicle data are collected from one or more vehicle sensors and a reference heat map is generated based on the collected information and data. The reference heat map indicates areas or regions in the scene information for which a driver should pay attention to enhance safe driving. In one embodiment, the vehicle data is determinative of a driver's intention. For example, the driver's intention may be determined by analyzing vehicle status such as navigation routine, speed, steering wheel angle, gas paddle/break paddle etc. In a further embodiment, a gaze direction and duration of the driver is determined and a gaze trajectory is generated. The gaze trajectory represents the actual driver's attention areas or regions as it relates to the scene information, which may be generated in the form a driver gaze heat map. Together, the reference heat map and driver gaze heat map are processed, for example using a deep learning method or rules-based method, to determine the attentiveness of the driver in the vehicle. If the driver is system determines that the driver is distracted (e.g., not attentive to high risk areas or regions requiring attention), then a warning or recommendation will alert the driver to pay attention to the surrounding environment or road conditions.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
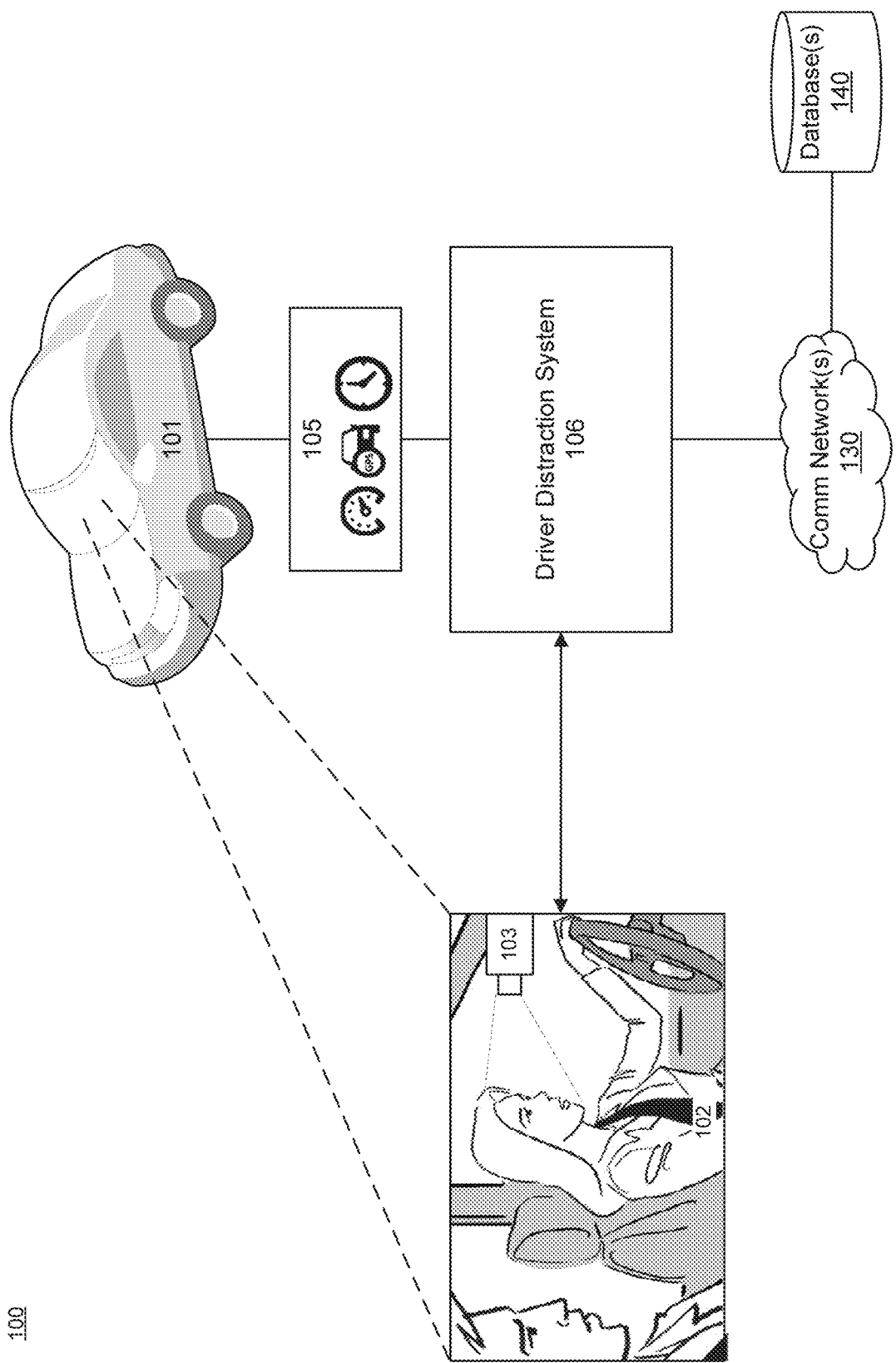
FIG. 1A illustrates a driver distraction system according to an embodiment of the present technology.

FIG. 1A illustrates a driver distraction system according to an embodiment of the present technology. The driver distraction system 106 is shown as being installed or otherwise included within a vehicle 101 that also includes a cabin within which a driver 102 can sit. The driver distraction system 106, or one or more portions thereof, can be implemented by an in-cabin computer system, and/or by a mobile computing device, such as, but not limited to, a smartphone, tablet computer, notebook computer, laptop computer, and/or the like.

In accordance with certain embodiments of the present technology, the driver distraction system 106 obtains (or collects), from one or more sensors, current data for a driver 102 of a vehicle 101. In other embodiments, the driver distraction system 106 also obtains (or collects), from one or more databases 140, additional information about the driver 102 as it relates to features of the driver, such as facial features, historical head pose and eye gaze information, etc. The driver distraction system 106 analyzes the current data and/or the additional information for the driver 102 of the vehicle 101 to thereby identify a driver's head pose and eye gaze. In one embodiment, the driver distraction system 106 additionally monitors and collects vehicle data and scene information, as described below. Such analysis may be performed using one or more computer implemented neural networks and/or some other computer implemented model, as explained below.

As shown in FIG. 1A, the driver distraction system 106 is communicatively coupled to a capture device 103, which may be used to obtain current data for the driver of the vehicle 101 along with the vehicle data and scene information. In one embodiment, the capture device 103 includes sensors and other devices that are used to obtain current data for the driver 102 of the vehicle 101. The captured data may be processed by processor(s) 104, which includes hardware and/or software to detect and track driver movement, head pose and gaze direction. As will be described in additional detail below, with reference to FIG. 1B, the capture device may additionally include one or more cameras, microphones or other sensors to capture data. In another embodiment, the capture device 103 may capture a forward facing scene of the route (e.g., the surrounding environment and/or scene information) on which the vehicle is traveling. Forward facing sensors may include, for example, radar sensors, laser sensors, lidar sensors, optical imaging sensors, etc. It is appreciated that the sensors may also cover the sides, rear and top (upward and downward facing) of the vehicle 101.

In one embodiment, the capture device 103 can be external to the driver distraction system 106, as shown in FIG. 1A, or can be included as part of the driver distraction system 106, depending upon the specific implementation. Additional details of the driver distraction system 106, according to certain embodiments of the present technology, are described below with reference to FIG. 1B.

Still referring to FIG. 1A, the driver distraction system 106 is also shown as being communicatively coupled to various different types of vehicle related sensors 105 that are included within the vehicle 101. Such sensors 105 can include, but are not limited to, a speedometer, a global positioning system (GPS) receiver, and a clock. The driver distraction system 106 is also shown as being communicatively coupled to one or more communication network(s) 130 that provide access to one or more database(s) 140 and/or other types of data stores. The database(s) 140 and/or other types of data stores can store vehicle data for the vehicle 101. Examples of such data include, but are not limited to, driving record data, driving performance data, driving license type data, driver facial features, drive head pose, driver gaze, etc. Such data can be stored within a local database or other data store that is located within the vehicle 101. However, the data is likely stored in one or more database(s) 140 or other data store(s) remotely located relative to the vehicle 101. Accordingly, such database(s) 140 or other data store(s) can be communicatively coupled to the driver distraction system via one or more communication networks(s) 130.

Figure 1B:
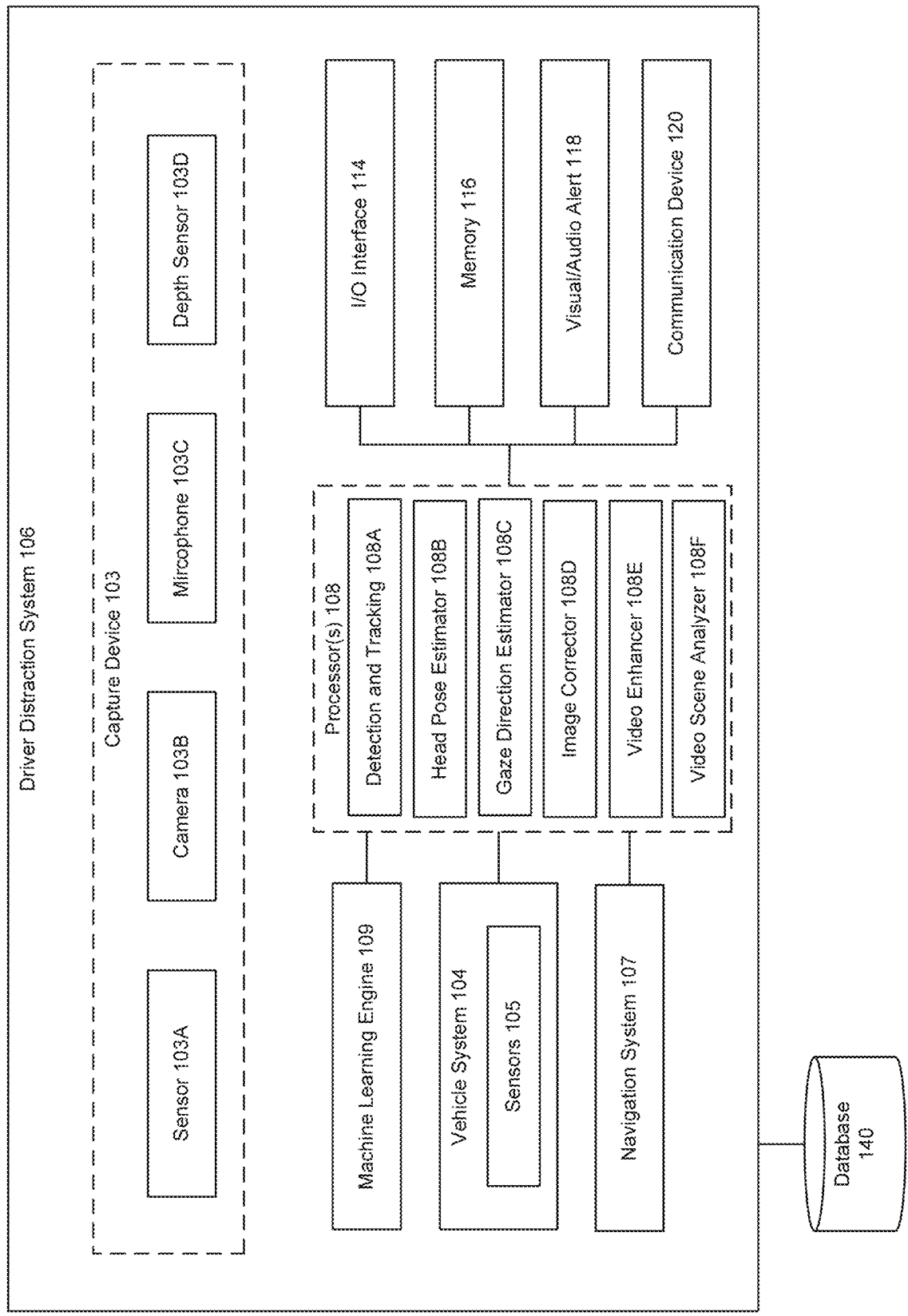
FIG. 1B illustrates a detailed example of the driver distraction system in accordance with FIG. 1A.

The communication network(s) 130 can include a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof. The communication network(s) 130 can provide communication capabilities between the driver distraction system 106 and the database(s) 140 and/or other data stores, for example, via communication device 102 (FIG. 1B).

While the embodiments of FIG. 1A are described with reference to a vehicle 101, it is appreciated that the disclosed technology may be employed in a wide range of technological areas and is not limited to vehicles. For example, in addition to vehicles, the disclosed technology could be used in virtual or augmented reality devices or in simulators in which head pose and gaze estimations, vehicle data and/or scene information may be required.

Additional details of the driver distraction system 106, according to certain embodiments of the present technology, will now be described with reference to FIG. 1B. The driver distraction system 106 includes a capture device 103, one or more processors 108, a vehicle system 104, a navigation system 107, a machine learning engine 109, an input/output (I/O) interface 114, a memory 116, a visual/audio alert 118, a communication device 120 and database 140 (which may also be part of the driver distraction system).

The capture device 103 may be responsible for monitoring and identifying driver behaviors (including distraction) based on captured driver motion and/or audio data using one or more capturing devices positioned within the cab, such as sensor 103A, camera 103B or microphone 103C. In one embodiment, the capture device 103 is positioned to capture motion of the driver's head and face, while in other implementations movement of the driver's torso, and/or driver's limbs and hands are also captured. For example, the detection and tracking 108A, head pose estimator 108B and gaze direction estimator 108C can monitor driver motion captured by capture device 103 to detect specific poses, such as head pose, or whether the person is looking in a specific direction.

Still other embodiments include capturing audio data, via microphone 103C, along with or separate from the driver movement data. The captured audio may be, for example, an audio signal of the driver 102 captured by microphone 103C. The audio can be analyzed to detect various features that may vary in dependence on the state of the driver. Examples of such audio features include driver speech, passenger speech, music, etc.

Although the capture device 103 is depicted as a single device with multiple components, it is appreciated that each component (e.g., sensor, camera, microphone, etc.) may be a separate component located in different areas of the vehicle 101. For example, the sensor 103A, the camera 103B, the microphone 103C and the depth sensor 103D may each be located in a different area of the vehicle's cab. In another example, individual components of the capture deice 103 may be part of another component or device. For example, camera 103B and visual/audio 118 may be part of a mobile phone or tablet (not shown) placed in the vehicle's cab, whereas sensor 103A and microphone 103C may be individually located in a different place in the vehicle's cab.

The detection and tracking 108A monitors facial features of the driver 102 captured by the capture device 103, which may then be extracted subsequent to detecting a face of the driver. The term facial features includes, but is not limited to, points surrounding eyes, nose, and mouth regions as well as points outlining contoured portions of the detected face of the driver 102. Based on the monitored facial features, initial locations for one or more eye features of an eyeball of the driver 102 can be detected. The eye features may include an iris and first and second eye corners of the eyeball. Thus, for example, detecting the location for each of the one or more eye features includes detecting a location of an iris, detecting a location for the first eye corner and detecting a location for a second eye corner.

The head pose estimator 108B uses the monitored facial features to estimate a head pose of the driver 102. As used herein, the term "head pose" describes an angle referring to the relative orientation of the driver's head with respect to a plane of the capture device 103. In one embodiment, the head pose includes yaw and pitch angles of the driver's head in relation to the capture device plane. In another embodiment, the head pose includes yaw, pitch and roll angles of the driver's head in relation to the capture device plane.

The gaze direction estimator 108C estimates the driver's gaze direction (and gaze angle). In operation of the gaze direction estimator 108C, the capture device 103 may capture an image or group of images (e.g., of a driver of the vehicle). The capture device 103 may transmit the image(s) to the gaze direction estimator 108C, where the gaze direction estimator 108C detects facial features from the images and tracks (e.g., over time) the gaze of the driver. One such gaze direction estimator is the eye tracking system by Smart Eye Ab®.

In another embodiment, the gaze direction estimator 108C may detect eyes from a captured image. For example, the gaze direction estimator 108C may rely on the eye center to determine gaze direction. In short, the driver may be assumed to be gazing forward relative to the orientation of his or her head. In some embodiments, the gaze direction estimator 108C provides more precise gaze tracking by detecting pupil or iris positions or using a geometric model based on the estimated head pose and the detected locations for each of the iris and the first and second eye corners. Pupil and/or iris tracking enables the gaze direction estimator 108C to detect gaze direction de-coupled from head pose. Drivers often visually scan the surrounding environment with little or no head movement (e.g., glancing to the left or right (or up or down) to better see items or objects outside of their direct line of sight). These visual scans frequently occur with regard to objects on or near the road (e.g., to view road signs, pedestrians near the road, etc.) and with regard to objects in the cabin of the vehicle (e.g., to view console readings such as speed, to operate a radio or other in-dash devices, or to view/operate personal mobile devices). In some instances, a driver may glance at some or all of these objects (e.g., out of the corner of his or her eye) with minimal head movement. By tracking the pupils and/or iris, the gaze direction estimator 108C may detect upward, downward, and sideways glances that would otherwise go undetected in a system that simply tracks head position.

In one embodiment, and based on the detected facial features, the gaze direction estimator 108C may cause the processor(s) 108 to determine a gaze direction (e.g., for a gaze of an operator at the vehicle). In some embodiments, the gaze direction estimator 108C receives a series of images (and/or video). The gaze direction estimator 108C may detect facial features in multiple images (e.g., a series or sequence of images). Accordingly, the gaze direction estimator 108C may track gaze direction over time and store such information, for example, in database 140.

The processor 108, in addition to the afore-mentioned pose and gaze detection, may also include a, an image corrector 108D, video enhancer 108E, video scene analyzer 108F and/or other data processing and analytics to determine scene information captured by capture device 103.

Image corrector 108D receives captured data and may undergo correction, such as video stabilization. For example, bumps on the roads may shake, blur, or distort the data. The image corrector may stabilize the images against horizontal and/or vertical shake, and/or may correct for panning, rotation, and/or zoom.

Video enhancer 108E may perform additional enhancement or processing in situations where there is poor lighting or high data compression. Video processing and enhancement may include, but are not limited to, gamma correction, de-hazing, and/or de-blurring. Other video processing enhancement algorithms may operate to reduce noise in the input of low lighting video followed by contrast enhancement techniques, such but not limited to, tone-mapping, histogram stretching and equalization, and gamma correction to recover visual information in low lighting videos.

The video scene analyzer 108F may recognize the content of the video coming in from the capture device 103. For example, the content of the video may include a scene or sequence of scenes from a forward facing camera 103B in the vehicle. Analysis of the video may involve a variety of techniques, including but not limited to, low-level content analysis such as feature extraction, structure analysis, object detection, and tracking, to high-level semantic analysis such as scene analysis, event detection, and video mining. For example, by recognizing the content of the incoming video signals, it may be determined if the vehicle 101 is driving along a freeway or within city limits, if there are any pedestrians, animals, or other objects/obstacles on the road, etc. By performing image processing (e.g., image correction, video enhancement, etc.) prior to or simultaneously while performing image analysis (e.g., video scene analysis, etc.), the image data may be prepared in a manner that is specific to the type of analysis being performed. For example, image correction to reduce blur may allow video scene analysis to be performed more accurately by clearing up the appearance of edge lines used for object recognition.

Vehicle system 104 may provide a signal corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network (CAN) bus through which engine related information may be communicated, a climate control CAN bus through which climate control related information may be communicated, and a multimedia data network through which multimedia data is communicated between multimedia components in the vehicle). For example, the vehicle system 104 may retrieve from the engine CAN bus the current speed of the vehicle estimated by the wheel sensors, a power state of the vehicle via a battery and/or power distribution system of the vehicle, an ignition state of the vehicle, etc.

Navigation system 107 of vehicle 101 may generate and/or receive navigation information such as location information (e.g., via a GPS sensor and/or other sensors 105), route guidance, traffic information, point-of-interest (POI) identification, and/or provide other navigational services for the driver. In one embodiment, the navigation system or part of the navigation system is communicatively coupled to and located remote from the vehicle 101.

Input/output interface(s) 114 allow information to be presented to the user and/or other components or devices using various input/output devices. Examples of input devices include a keyboard, a microphone, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a visual/audio alert 118, such as a display, speakers, and so forth. In one embodiment, I/O interface 114 receives the driver motion data and/or audio data of the driver 102 from the capturing device 103. The driver motion data may be related to, for example, the eyes and face of the driver 102, which may be analyzed by processor(s) 108.

Data collected by the driver distraction system 106 may be stored in database 140, in memory 116 or any combination thereof. In one embodiment, the data collected is from one or more sources external to the vehicle 101. The stored information may be data related to driver distraction and safety, such as information captured by capture device 103. In one embodiment, the data stored in database 140 may be a collection of data collected for one or more drivers of vehicle 101. In one embodiment, the collected data is head pose data for a driver of the vehicle 101. In another embodiment, the collected data is gaze direction data for a driver of the vehicle 101. The collected data may also be used to generate datasets and information that may be used to train models for machine learning, such as machine learning engine 109.

In one embodiment, memory 116 can store instructions executable by the processor(s) 108, a machine learning engine 109, and programs or applications (not shown) that are loadable and executable by processor(s) 108. In one embodiment, machine learning engine 109 comprises executable code stored in memory 116 that is executable by processor(s) 108 and selects one or more machine learning models stored in memory 116 (or database 140). The machine models can be developed using well known and conventional machine learning and deep learning techniques, such as implementation of a convolutional neural network (CNN), described in more detail below.

Figure 2:
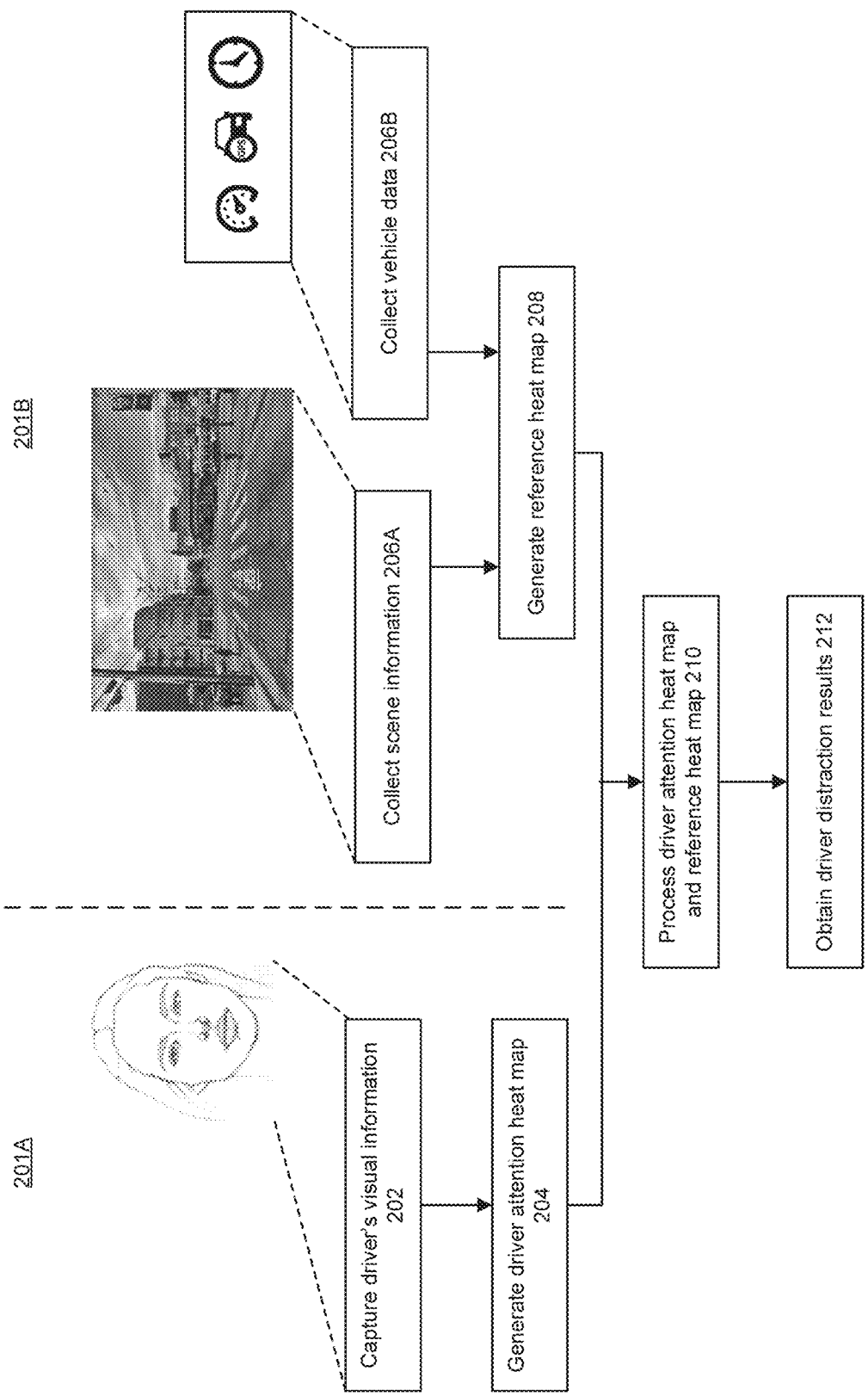
FIG. 2 illustrates an example flow diagram of obtaining driver distraction information in accordance with embodiments of the disclosure.

FIG. 2 illustrates an example flow diagram of obtaining driver distraction information in accordance with embodiments of the disclosure. In embodiments, the flow diagrams may be computer-implemented methods performed, at least partly, by hardware and/or software components illustrated in the various figures and as described herein. In one embodiment, the disclosed process may be performed by the driver distraction system 106 disclosed in FIGS. 1A and 1B. In one embodiment, software components executed by one or more processors, such as processor(s) 108 or processor 802, perform at least a portion of the process.

The process of obtaining driver distraction information (results) is shown as divided into two sections—section 201A describes the capturing of driver 102 information to generate a driver gaze heat map, and section 201B describes the collection of scene information and vehicle data to generate a reference heat map. Although the process is shown as being divided into two sections for purposes of discussion, during implementation the sections may be implemented in parallel or simultaneously.

The process depicted in section 201A uses one or more capture devices 103 to capture the driver's visual information (e.g., image of the driver) at step 202 for determining head pose and gaze estimation. The capture devices 103 may include, but are not limited to, driver facing sensors (such as infrared, ultrasonic, image, depth, etc.), cameras, microphone, etc.). The driver's visual information is extracted from the capture device(s) 103 and sent to processor(s) 108 for detection and tracking by detection and tracking 108A, head pose estimation by head pose estimator 108B and/or gaze direction estimation by gaze direction estimator 108C in which to estimate the gaze direction (angle) and duration.

In one embodiment, the driver's gaze direction and duration is monitored in real-time and may be interpreted as a three-dimensional (3D) vector or horizontal and vertical angle. However, any number of approaches may be implemented to estimate the gaze direction, such as geometry-based or deep learning methods. Geometry-based methods use geometric relationships between near inferred light and the reflection of near inferred light on the driver's iris and eye center to obtain the gaze direction. Examples include two-dimensional (2D) and 3D models that use near infrared (NIR) illumination to create corneal reflections and track them with respect to the pupil center to estimate the gaze vector. These methods require polynomial or geometric approximations of the eye to obtain the gaze direction or the point of gaze. Another technique includes an appearance based method, which uses eye region images to extract content information such as local features, shape and texture of eye regions to estimate gaze direction. Still further, deep learning approaches use neural networks, such as a convolutional neural network (CNN), to extract information from appearance information. CNNs have the ability to learn multiple levels of non-linear transforms on input data (e.g., face image) using labeled examples through gradient descent based optimizations. CNNs include filters that are fully parametrized (trainable) and convolve the input to produce feature maps, non-linearities, pooling layers/down-sampling layers that downsample the feature maps, and fully connected layers.

Using any of the techniques described above (or otherwise known in the art) to estimate driver gaze direction and duration, a heat map may be generated at step 204. Generation of a heat map will be explained below with reference to FIG. 3B

The process depicted in section 201B uses one or more capture devices 103 to capture scene information and vehicle data. In one embodiment, scene information is collected at step 206A. Scene information may include information obtained from the environment surrounding the vehicle, such as road conditions (e.g., paved, dirt, potholes, hills, snow covered, rain covered, etc.), streets (e.g., street names, crossroads, intersections, etc.), map and landscape of the surrounding environment (e.g., as determined by images or online maps, radar maps, etc.), weather (e.g., hot, cold, snow, rain, dry, etc.), time of day (e.g., morning or evening, etc.), light conditions (e.g., sunny, dark, etc.), information obtained by tracking or navigation systems (e.g., GPS, etc.), and the like. Capturing devices 103 used to capture the scene information may include, but are not limited to, lidar sensors, cameras, infrared sensors, radar sensors, laser rangefinders, video sensors, etc.

In one embodiment, vehicle data is collected at step 206B. Vehicle data includes, but is not limited to, speed, location, orientation, tire pressure, amount of swerving data, duration of trip data, prior vehicle data (or historical data), headlight usage, lane change data, turn data, turn signal information, etc. Capture devices 103 to capture the vehicle data may include, but are not limited to, a compass, a navigation system, location and orientation sensors, image sensors, geographic information sensors, steering wheel sensor, brake sensor, pedal sensor, speedometer, day and time sensors, telemetry sensors, etc. In one embodiment, the vehicle data 206B collected at step 206B may be indicative of driver intention or action. For example, if a steering wheel sensor provides an output that indicates a quick turn of the steering wheel and a brake sensor indicates the brakes are being pressed firmly, the combination may indicate that the driver is attempting to avoid hitting an object by application of brakes and swerving around the object.

The driver "intention" or "action" may also be based on or learned from the historical data of the driver (e.g., information of an individual driver or multiple different drivers) that has been collected over a period of time, the vehicle data in real-time and/or a combination of real-time vehicle data and the historical data. The collected historical data may identify patterns or a sequence of actions that are indicative of or reflect the driver's intent when performing various actions or during certain activity. The historical data can also include information about a driver's years of experience, type of experience, history of traffic accidents, items from an employment personnel record, history of speeding and/or other traffic violations, number, severity, and length of previously identified occurrences of various driver behaviors. In one embodiment, the driver distraction system 106 may collect and store a driving profile in database 140 or memory 116 for a particular driver or drivers as part of a driver's history. For example, the driver's profile may also include how quickly the driver accelerates or decelerates, usual speeds for particular driving conditions, e.g., night driving, driving in rain or snow, etc., how often the driver swerves or crosses the center line, and the like. The historical data in one embodiment may be retrieved from the database 140 or memory 116, such as a database of the driver's insurance company. The historical data may also include information regarding one or more driving routes such as road profiles, road topologies, the number of stops associated with a driving route, the number of turns associated with a driving route, etc.

Capture devices 103 collect the scene information at step 206A and collect the vehicle data at step 206B. Once collected, the scene information and vehicle data is extracted and may be sent to at least one of vehicle system 104, navigation system 107 and processor(s) 108. In one embodiment, images extracted may be corrected by image corrector 108D, videos enhanced by video enhancer 108E and video scenes analyzed by video scene analyzer 108F for additional processing. Once the scene information and vehicle data have been collected, a reference heat map may be generated at 208. The reference heat map, which will be discussed in more detail below, includes areas or regions that are related to safe driving and require a lower level of driver attention, as well as areas or regions that are related to distracted driving and require a higher level of driver attention. In one embodiment, a weight or score is associated with the areas and regions.

For example, in bad weather or during rush hour or at night, various areas or regions in the surrounding environment require a higher level of driver attention than areas or regions in the surrounding environment during good weather, non-rush hour and during the day. These areas or regions may be deemed as safe driving areas where lower levels of driver distraction are likely occur, and distracted driving areas where higher levels of driver distraction are likely to occur. In another example, drivers may require a higher level of attention while traveling along a winding road or a highway than would be required while traveling along a straight road or a cul-de-sac. In this case, drivers traveling along the winding road or highway may have areas or regions of higher levels of driver distraction, whereas drivers traveling along a straight road or a cul-de-sac may have areas or regions of lower levels of driver distraction. These areas or regions of driver attention are identifiable in the reference heat map, as discussed below.

At step 210, at least one processor, such as processor(s) 108, processes the driver gaze heat map generated at step 204 and the reference heat map generated at 208. In one embodiment, the driver gaze heat map and the reference heat map may be merged (or fused) and processed to identify areas and regions that require (or do not require) driver attention. For example, the driver gaze heat map and the reference heat map may be input into a deep learning network, such as an encoder-decoder network, for processing to generate the reference heat map. A description of the deep learning network and the reference heat map is provided below with reference to FIGS. 3A and 3B.

The output of processing the driver gaze heat map and the reference heat map in step 210 produces results representative of a level of driver distraction at step 212. Depending on the results, the driver's attention may be diverted to various areas or regions of the output. In one embodiment, the results may be output as a visual and/or audio recommendation or warning. For example, a visual warning, such as a light emitting diode (LED) under the windshield, may be turned on, or a road scenario may be displayed on a screen that recommends to the driver to pay attention to highlighted areas or regions. Another example includes an audible recommendation or warning. Such a recommendation or warning may include a beep or verbal announcement over speakers that indicate where the driver should pay attention. The driver distraction results are described in more detail below.

Figure 3A:
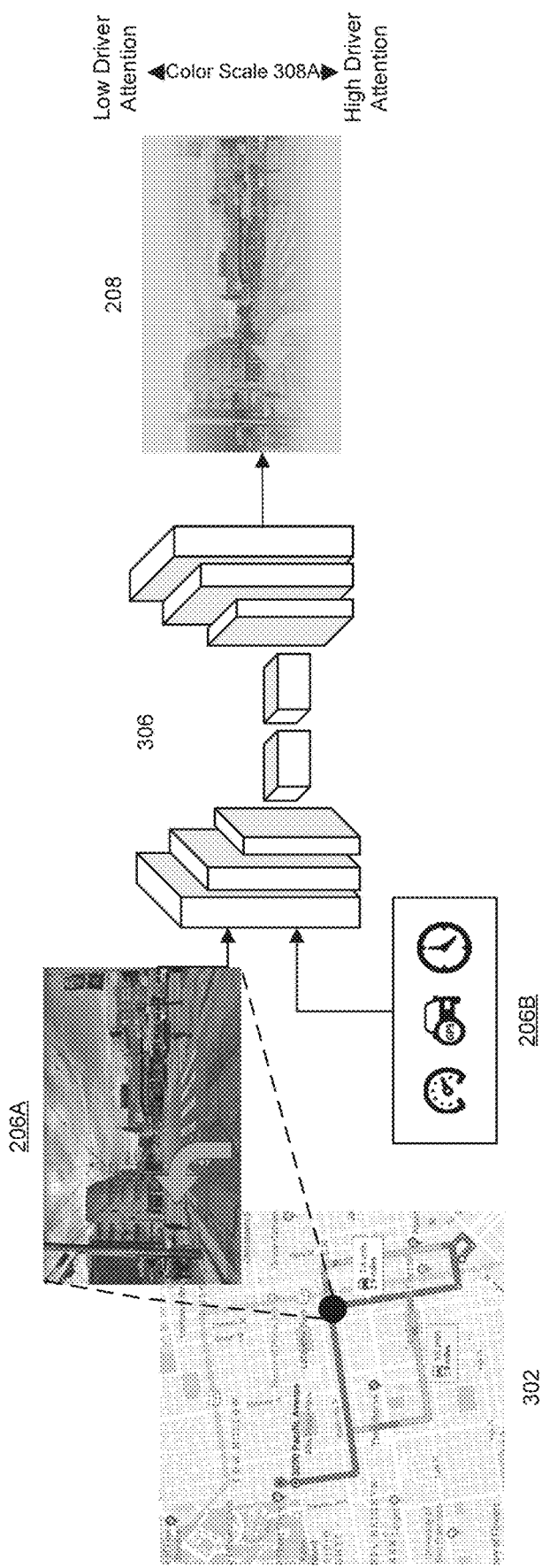
FIG. 3A illustrates an example of creating a reference heat map in accordance with FIG. 2.

FIG. 3A illustrates an example of creating a reference heat map in accordance with FIG. 2. In one embodiment, the reference heat map 208 is generated using a combination of the collected scene information 206A and the vehicle data 206B which is processed by a deep learning network, such as CNN 306. In one embodiment, the CNN 306 is an encoder-decoder type CNN. The encoder portion (where the input is received—in this case, the scene information and vehicle data) of CNN 306 extracts high-level information (such as objects—e.g., cars, crosswalks, traffic lights, etc.) from low-level image information (such as plain colored pixels). In particular, the encoder-decoder type CNN 306 may comprise three types of networks: Convolution, Pooling and Batch Normalization. The convolutional layer extracts local features, the pooling layer downsamples the feature map and propagates special invariant features to deeper layers and the batch normalization layer normalizes the distribution of training data aiming to accelerate learning. At completion of the encoding, the feature map in the original scene is extracted and the output is resized to be a feature vector. To obtain the driver's intention from the vehicle data, the vehicle data (collected as a vector) is concatenated to the feature vector (concatenated with the fully-connected layer). Afterwards, the feature vector is resized again to be a feature map. After encoding, the decoder portion (where the output is generated—in this case, a reference heat map) receives the high-level information and maps it into another medium level to reform the information into an image with a same size, such that objects having a same label are also assigned a same color (for the heat map). Specifically, the decoder unsamples the image to the same size as the image input into the encoder portion and performs another convolution. This convolution adds geometric details to the feature map to make up for any loss at the pooling layer during encoding, resulting in a smoother and less-aliased output. A further description of CNN 306 is found below with reference to FIG. 3B.

The reference heat map 208 may be generated in real-time, and identify areas or regions using different colors, indicators (e.g., numbers, pointers, etc.) or other identifying techniques. These areas or regions identified on the reference heat map 208 may correspond to areas or regions requiring varying levels or degrees of driver attention. For example, the heat map 208 may include areas or regions with weighted driver attention levels, where areas or regions with positive values indicate more driver attention is required while areas with negative values require less driver attention. (It is appreciated that in the depicted embodiment, grayscale is used instead of colors). In one example, a color scale 308A may indicate areas or regions requiring a higher level or driver attention using the color red, whereas areas or regions requiring a lower level or driver attention may use the color green. As the particular areas or regions require more or less attention, the colors and/or indicators on the reference heat map 208 may change to reflect the requisite level or degree of attention on behalf of the driver. For example, an area or region that includes a traffic light may be colored red or have an indicator (such as an arrow) that diverts the driver's attention for a predetermined period of time to watch the traffic light. In another example, the driver's attention may be diverted to follow a pedestrian as she walks across the street. The area or region the pedestrian is walking may be highlighted using a color (such as red) or highlighted using an indicator. Similarly, areas or regions requiring a lower level of driver attention, such as a sign or billboard, may be highlighted using the color green. In some instances, the level or degree of driver attention may be based on a user profile or a route that the vehicle is driving. In other instances the level or degree of driver attention may be dictated by known or commonly recognized regions generally requiring driver attention, such as crosswalks, winding roads, etc.

Sensor measurements to collect scene information 206A include an image or video (e.g., set of images) of the environment surrounding the vehicle 101. The images or video may be captured, for example, by an outward-facing camera directed from the front of the vehicle 101 (e.g., through the front windshield, mounted on an exterior of the vehicle, etc.). The camera's field of view includes all or a portion of the roadway oriented toward the front the vehicle 101 (e.g., the foreground toward the front of the vehicle, the lane in which the vehicle is moving, the adjacent lane or lanes, etc.), and can optionally include the area(s) or region(s) to the sides of the vehicle 101 (e.g., the driver's side, the passenger's side), to the rear of the vehicle 101, above the vehicle 101 (e.g., through a sunroof and/or moonroof), or include any other suitable portion of the environment outside the vehicle 101. In one embodiment, the image(s) can be used to optically identify and/or track the vehicle's position within the environment (e.g., localize the vehicle), position within a lane, position relative to other objects (e.g., vehicles, pedestrians, etc.), and the like. The image(s) can additionally be used to determine the driving context, such as whether there is an object in front of or beside the vehicle 101, whether the roadway is mountainous or has curves, etc. The image(s) can additionally be used to determine, verify, and/or validate other factors, such as drifting within a lane of the roadway, although such information may also be obtained by the vehicle data.

The images and video may be captured in any number of different forms, by any number of different sensors. For example, the images can be a visual spectrum image, hyperspectral image, IR image, or be sampled at any other suitable wavelength. The image can be recorded using ambient light, light emitted by a light emitter (e.g., from an LED flash, etc.), or using any other suitable light source. The image can be a stereo image (e.g., recorded by a stereo camera), a single image, or be any other suitable image. The images may also be combined as a sequence of images to form a video, as noted above. In the depicted example, the image (represented by collected scene information 206A) is a street scene of a road and buildings captured by a forwarding facing camera attached to the vehicle 101. In the captured image, the street scene also includes people on the sidewalk (on either side of the road), a traffic light, signs and crosswalks. The image may represent a street scene that corresponds to map, such as online map 302, which is generated by a navigation system 107. In one embodiment, the navigation system 107 overlays navigational information onto the image. For example, the image may be a view of a location on the online map 302 (represented on the map as a black dot) and a turn signal (represented by a curved arrow) may overlay the image.

In one embodiment, sensor measurements include vehicle data 206B that is collected by sensors on the vehicle 101. The vehicle data 206B can be received from the vehicle 101 through a vehicle data bus, wirelessly communicated from the vehicle 101, or otherwise received from the vehicle 101. The vehicle data 206B can include, but is not limited to, control panel signals (e.g., whether the radio is being changed, whether the user interface is being used, etc.), steering wheel signals (e.g., number of touches, high pressure regions, high temperature regions, etc. on the steering wheel), seat sensor signals (e.g., driver's weight distribution or change over time, etc.), or any other suitable set of measurements. Sensor measurements may also include any other vehicle information acquired from the vehicle's computer or communication/network bus and/or one or more sensors (e.g., brake sensors, pedal sensors, positioning sensor, odometer sensor, speed sensor, tire pressure sensor, lane departure sensor, following distance sensor, roll stability sensor) provided in or on the vehicle 101, as well as those described above.

Figure 3B:
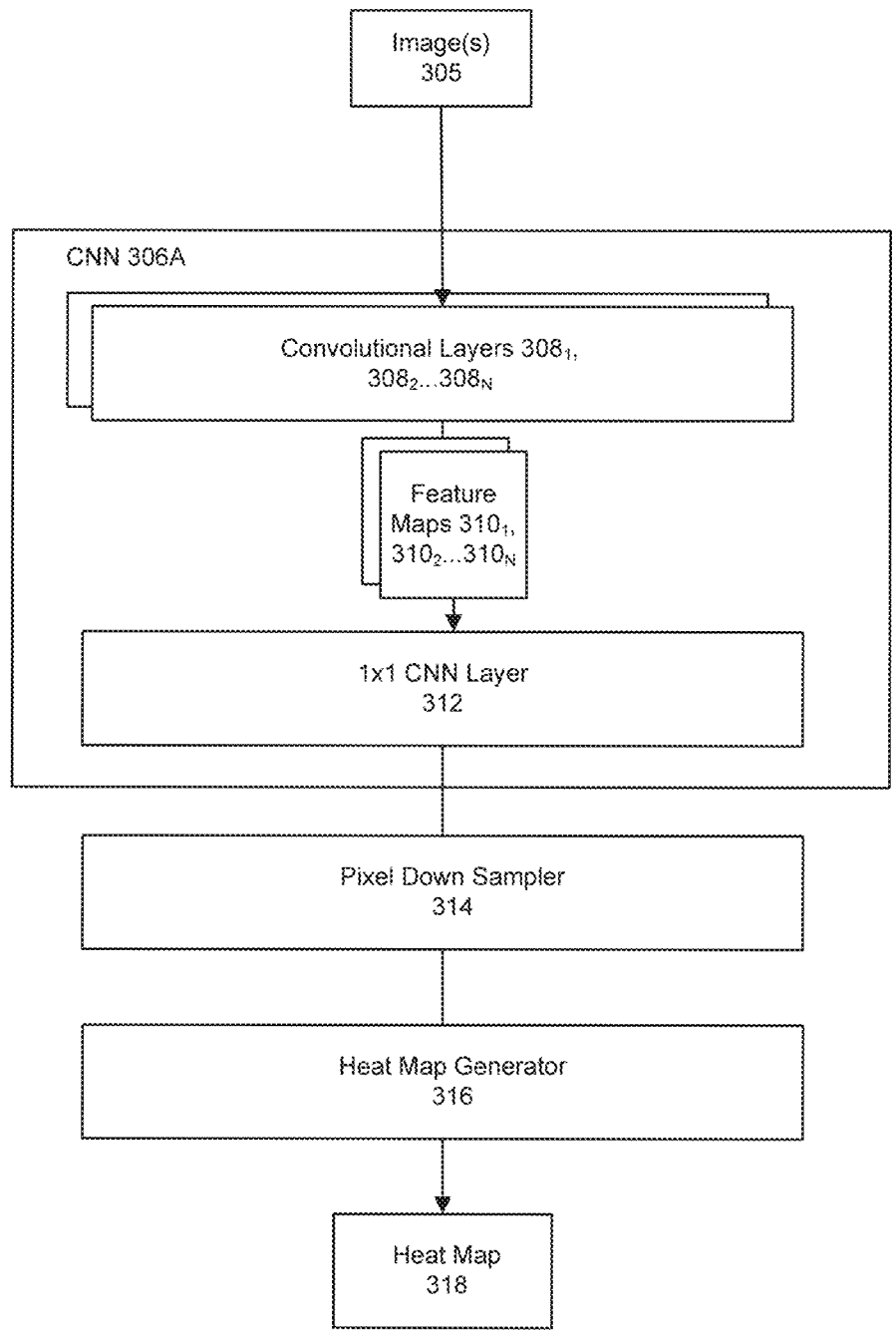
FIG. 3B illustrates an example CNN in accordance with the embodiment of FIG. 3A.

FIG. 3B illustrates an example CNN in accordance with the embodiment of FIG. 3A. In the depicted example, CNN 306A includes CNN layers 3081, 3082 . . . 308N, features maps 3101, 3102 . . . 310N, and a 1×1 CNN layer 312, which is coupled to or includes a pixel down sampler 312 and a heat map generator 316. The CNN 306, which has been previously trained, receives one or more images 305 to detect location regions of various spaces and/or objects within each image 305. The images 305 are received by the CNN 306A. For example, images may include a scene, such as scene information 206A in FIG. 3A, that has a road, buildings and other identifiable objects (e.g., other cars, people, animals, etc.). CNN 306A, through its convolutional layers 3081, 3082 . . . 308N perform convolutional computations to generate feature maps 3101, 3102 . . . 310N. The feature maps 3101, 3102 . . . 310N are extracted and output to be a feature vector. A vector is concatenated to the feature vectors including vehicle speed, turn status, brake status, navigation instructions, etc. and the feature vector is resized to be a feature map 3101, 3102 . . . 310N. Subsequently, a 1×1 convolutional layer 312 reduces the feature maps 3101, 3102 . . . 310N down to single decision points on a per-pixel basis, referred to herein as per-pixel decision points. A classifier (not shown) uses the per-pixel decision points to determine whether a particular pixel belongs to a particular target class, such as a "crosswalk" target class.

In one embodiment, a pixel down sampler 314 is used to reduce the number of per-pixel decision points for which to evaluate. Pixel down sampler 314 down samples the per-pixel decision points, such as a 4× down sampling. Then, for each pixel that is down sampled (e.g., 4×), a heat map generator 316 determines whether the down sampled per-pixel decision points belong to a particular target class. In turn, heat map generator 316 generates a heat map 318 that identifies, on a down sampled per-pixel basis, areas or regions in the images 305 that include objects corresponding to target classes. In one embodiment, the heat map 318 is evaluated to identify the areas or regions corresponding to different objects (e.g., a pedestrian, a roadway, a crosswalk, traffic lights, vehicles, etc.). Accordingly, different image target classes of different object types may be identified in the areas or regions of the images 305. For example, an area or region on reference heat map 208 may have per-pixel points determined to be a first target class that corresponds to a pedestrian, and a second target class that corresponds to a crosswalk on the roadway.

Figure 4:
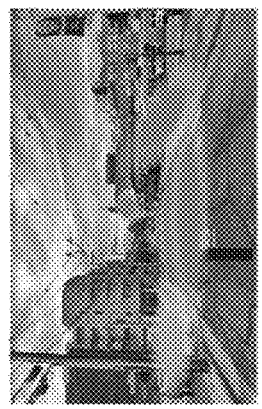
FIG. 4 illustrates an example embodiment of generating a driver gaze heat map based on a gaze direction and duration of a driver of a vehicle.
Figure 4:
Figure 4:
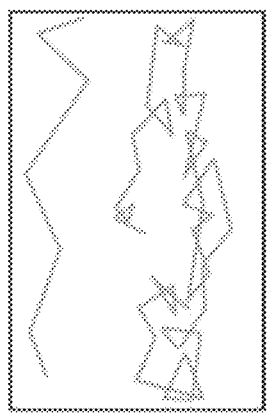
Figure 4:
Figure 4:
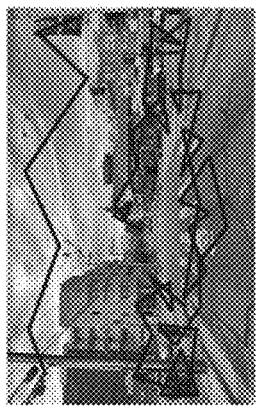

FIG. 4 illustrates an example embodiment of generating a driver gaze heat map based on a gaze direction and duration of a driver of a vehicle. As depicted, an environment 402 (e.g. street scene represented by the scene information) is captured by capture device 103 coupled to vehicle 101. The driver gaze direction and duration may be monitored while the driver 102 is driving the vehicle 101 along a route. The captured gaze direction and duration may be processed, for example, using the detection and tracking 108A, head pose estimator 108B and/or gaze direction estimator 108C. As discussed above, any different number of gaze estimation techniques may be used to track the driver's gaze direction and duration In one embodiment, the processed gaze direction and duration may generate a gaze trajectory (represented by the solid black lines) that represents areas or regions in the environment 402 viewed by the driver 102 of the vehicle 101. For example, a driver's gaze direction corresponding to one or more generalized areas (e.g., upward, downward, etc.) may be tracked, as well as the amount of time spent gazing at the generalized area, and used to generate the gaze trajectory. More specifically, the gaze direction and duration may be represented according to the formula: $Gt=[(x, y), t]$, where $(x, y)$ represents a two-dimensional (2D) location of the gaze in the environment 402 and t represents a timestamp during collection of the gaze direction. Using this information, the gaze trajectory may be plotted against the environment 402 during a period of time (duration) from time t1 to time t2. As appreciated, multiple gaze direction and duration information of the driver 102 may be collected over different periods of time and in different environments as the vehicle 101 travels along a route. Optionally, in one embodiment, the gaze trajectory may be filtered from the environment 402 using, for example, a Kalman filter, moving average filter etc., for de-noising to generate a filtered gaze trajectory 404. The filtered gaze trajectory may then be applied to the environment 402 to generate the driver gaze heat map 406. In one embodiment, for each gaze direction and duration in the gaze trajectory, the gaze direction and duration are accumulated using a Gaussian (or normal) distribution and recorded on the gaze heat map. As a result, areas or regions with more gaze trajectories may be designated as locations with higher viewing by the driver 102.

Figure 5:
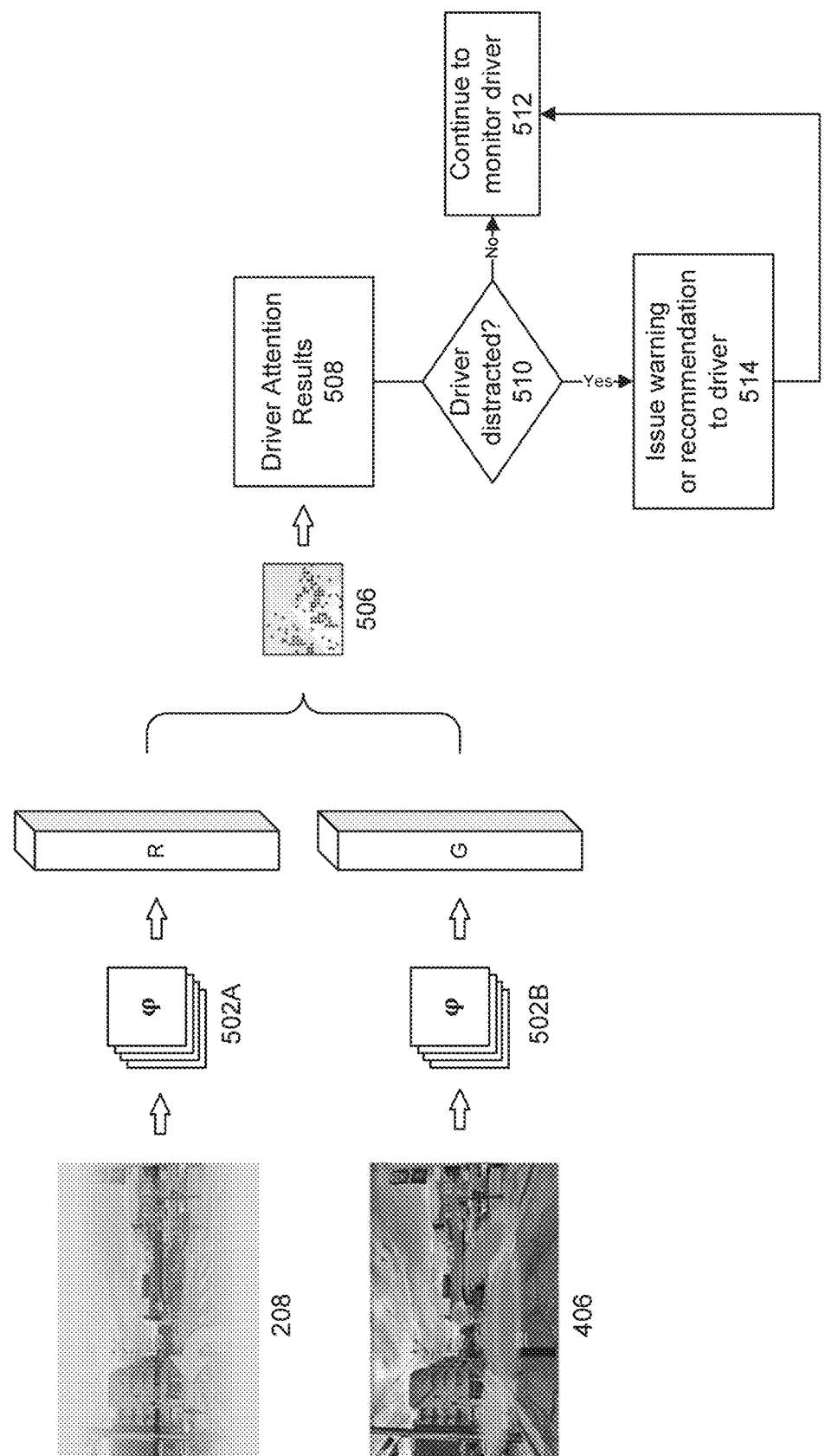
FIG. 5 illustrates a driver attentiveness network using the reference heat map and driver gaze heat map in accordance with FIGS. 3A and 4.

The driver gaze heat map 406 provides statistical information regarding driver gaze direction over a period of time (duration). For example, the driver gaze heat map 406 may indicate areas or regions (which may be associated with a particular class or object) of a driver gaze for a duration that the driver was viewing while driving. In one embodiment, the driver gaze heat map 406 is a visual representation of an environment (e.g., street scene) with highlighted areas or regions (shown in grayscale) showing locations which receive the most attention from the driver 102. These highlighted areas or regions may take the form of a traditional heat map where, for example, a color of red, orange and the like show areas of a higher level of driver attention whereas colors of blue, green and the like show areas or regions of a lower level of driver attention. However any form of visual representation may be used such as shapes, logos, images, etc. In other embodiments, the highlighted regions may be weighted with a value to indicate the level of driver attention. It is appreciated that unlike the reference heat map 208 in which the areas or regions represent locations requiring a specific level of attention by the driver, the areas or regions in the driver gaze heat map 406 represent levels of attention of the driver based on gaze direction and duration FIG. 5 illustrates a driver attentiveness network using the reference heat map and driver gaze heat map in accordance with FIGS. 3A and 4. The driver attentiveness network 500 takes the reference heat map 208 and the driver gaze heat map 406 as input and generates driver attentiveness results (attention results) 508 by merging the inputs using a deep learning network, such as a Siamese neural network ($\varphi$). A Siamese neural network determines the similarity between two comparable inputs—in this case, between the reference heat map 208 and the driver gaze heat map 406.

The Siamese neural network has two comparable subnetworks 502A and 502B, in which the subnetworks have the same parameters and weights. The reference heat map 208 is input into the first subnetwork 502A, which includes a sequence of convolutional, pooling, fully connected layers and a feature vector R. The feature vector R represents the encoding of the input (i.e., the reference heat map). In one embodiment, the reference heat map 208 will be used as a ground-truth. Similarly, the driver gaze heat map 406 is input into the second subnetwork 502B, which includes a sequence of convolutional, pooling, fully connected layers and a feature vector G. The feature vector G represents the encoding of the input (i.e., the driver gaze heat map). The two feature vectors R and G may then be evaluated to determine a distance between the two encodings using, for example, a loss function. The results are merged or fused, as explained above, to form a driver attention heat map 506 and the Siamese network 500 outputs driver attention results 508. One example of a Siamese neural network is described in "Siamese Neural Networks for One-shot Image Recognition," Department of Computer Science, University of Toronto, by Koch et al.

Figure 6:
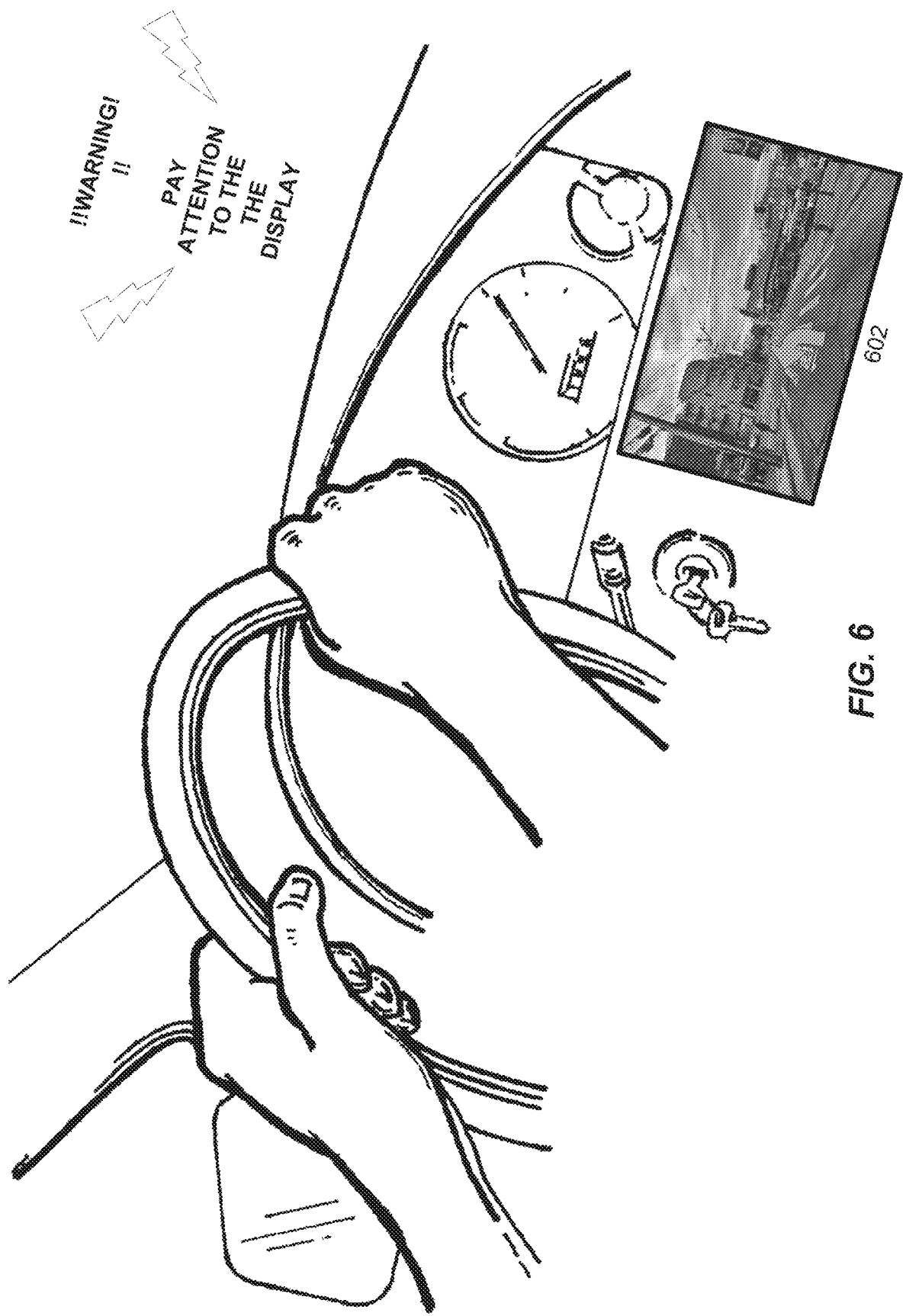
FIG. 6 illustrates an example in-cabin vehicle setting with a warning being issued to the driver.

Driver attention results 508 generally identify whether a driver is driving attentively or driving distracted. Based on the driver attention results 508, the driver distraction system 106 may proceed to further monitor the driver 102 and/or provide a warning or recommendation. In one embodiment, if the attention results 508 indicate that a driver is driving attentively, then the driver distraction system 106 may continue to monitor the driver 102 of the vehicle at step 512 until driving is completed. In another embodiment, if the attention results 508 indicate that the driver 102 is driving distracted, a warning or recommendation may be issued to the driver 102 at step 514, as shown in the example of FIG. 6. The warning or recommendation may use a visual warning and/or audio warning signal to get a hold of the driver's attention. A visual warning, such as light flashing or a written message on the display 602, will be turned on at which the driver should pay attention. Other visual warnings may also be displayed in a variety of other forms, such as arrows, pointers, or any other indicator. The visual warning may be displayed in any number of different mediums, such as in heads-up-display or on the display of a mobile device. An audio warning, separately or in combination with the visual warning, may also be played to grab the driver's attention. For example, speakers playing in the vehicle can play a loud noise or announce a recommendation akin to a fire alarm in a hotel.

In one embodiment, the level of driver distraction may be measured according to a score or scoring scale. For example, a level of driver distraction may be determined based on a scale from 1 to 100. A score of 1 may be indicative that the driver 102 is not distracted or is attentively driving, while a score of 100 may be indicative that the driver 102 is completely distracted or not paying attention to areas or regions in the environment that have been determined to be locations requiring a high level of driver attention. Scores falling in between 1 and 100 may be quantified as having low to moderate to severe indications of driver attention or distraction.

In another embodiment, the score may be determined based on the amount of driver's gaze overlap with an object in the environment (viewed by the driver in the vehicle) or based on the driver's anticipated gaze overlap with the anticipated position of the object in the environment. In one example, the driver distraction system 106 can identify objects in the vehicle's surrounding environment, determine the driver's gaze direction and duration, optionally determine the driver's field of view (FoV), and determine a distraction score based on the amount of driver's gaze or field of view overlap with the identified objects. In another example, the score can be determined based on the rate at which the object of a driver's gaze and duration changes. For example, the score can be increased based on the rate falling below a threshold level, which can be indicative that the driver is not adequately scanning the environment while operating the vehicle and is instead gazing at a fixed point (e.g., and may be lost in thought).

In one embodiment, the score (or scoring scale) may be based on a specific driver's profile and/or historical data. For example, a specific driver may be known to have problems when driving around a curved road at high speeds, while being know to stop meticulously at stop signs. Other embodiments may score simply based on situational events or context. For example, if a traffic light is red and the driver distraction system 106 determines that a driver 102 is gazing to the rear cabin of the vehicle 101, a high score may be associated with the driver attention results 508 such that a warning is provided to the driver 102 to stop at the light. In still other embodiments, scores may updated based on the collected scene information, vehicle data and gazes direction and duration of real-time events or prior activities.

FIGS. 7A-7C illustrate example flow diagrams for monitoring driver attentiveness in a vehicle in accordance with embodiments of the disclosure. In embodiments, the flow diagrams may be computer-implemented methods performed, at least partly, by hardware and/or software components illustrated in the various figures and as described herein. In one embodiment, the disclosed process may be performed by the driver distraction system 106 disclosed in FIGS. 1A and 1B. In one embodiment, software components executed by one or more processors, such as processor(s) 108 or processor 802, perform at least a portion of the process.

With reference to FIG. 7A, the driver distraction system 106 collects scene information 206A and vehicle data 206B using one or more sensors to monitor for driver attentiveness and distraction at step 702. The scene information represents an environment surrounding the vehicle while traveling along a route. For example, the environment may include a scene captured by cameras coupled to the vehicle or current road conditions. In one embodiment, the collected scene information 206A and vehicle data 206B are processed to generate a reference heat map 208 at step 702A. The reference heat map 208 nay be generated from the scene information 206A and the vehicle data 206B using a CNN that has one or more convolutional layers and at least one fully-connected layer, such that the reference heat map 206A identifies one or more regions in the scene information 206A requiring driver attention for safe driving.

The driver distraction system 106 also captures visual information 202 (e.g., driver pose and/or gaze direction and duration) of the driver 102 of the vehicle 101 at step 704. In one embodiment, the gaze direction and duration are processed to generate a driver gaze heat map 406 at step 704A. The driver gaze heat map 406 may be generated based on the gaze direction and duration of the driver 102 while driving the vehicle 101, such that the driver gaze heat map 406 identifies one or more zones in the scene information viewed by the driver during the duration.

At step 706, the reference heat map 208 and the driver gaze heat map 406 are analyzed by the driver distraction system 106 to determine a level of driver distraction (or attentiveness) of the driver 102 in the vehicle 101. In one embodiment, the reference heat map 208 and the driver gaze heat map 406 are merged or fused to form a driver attention heat map 506 at step 706A.

The driver attention heat map 506 is then analyzed to output a warning or recommendation to the driver 102 of the vehicle 101 according to a level of driver distraction at step 708.

Turning to FIG. 7B, the sub-process of collecting scene information 206A and vehicle data 206B are described. At step 702B, a position of the vehicle 101 is recorded while driving along a route. The position of the vehicle 101 may be determined using any number of different techniques, such as using the navigation system 107 which may include GPS. Historical vehicle data may then be retrieved from a database that is representative of the vehicle data over a predetermined period at step 702C, and the scene information may be collected at step 702D. In one embodiment, the collecting the scene information includes collecting street images in real-time from the one or more sensors or an online map.

In FIG. 7C, the sub-process of capturing pose and gaze of a driver is described. Tracking the gaze direction and duration of the driver 102 includes capturing a sequence of images of the driver 102 over a duration (e.g., period of time) at step 704B. In one embodiment, one or more sensors in the vehicle, such as a camera, are used to capture the driver images. At step 704C, the gaze direction of the driver 102 is estimated based on the pose and gaze extracted from the sequence of images, and the gaze direction is applied to overlay the scene information 206A to form the gaze heat map 406 at step 704D.

Figure 8:
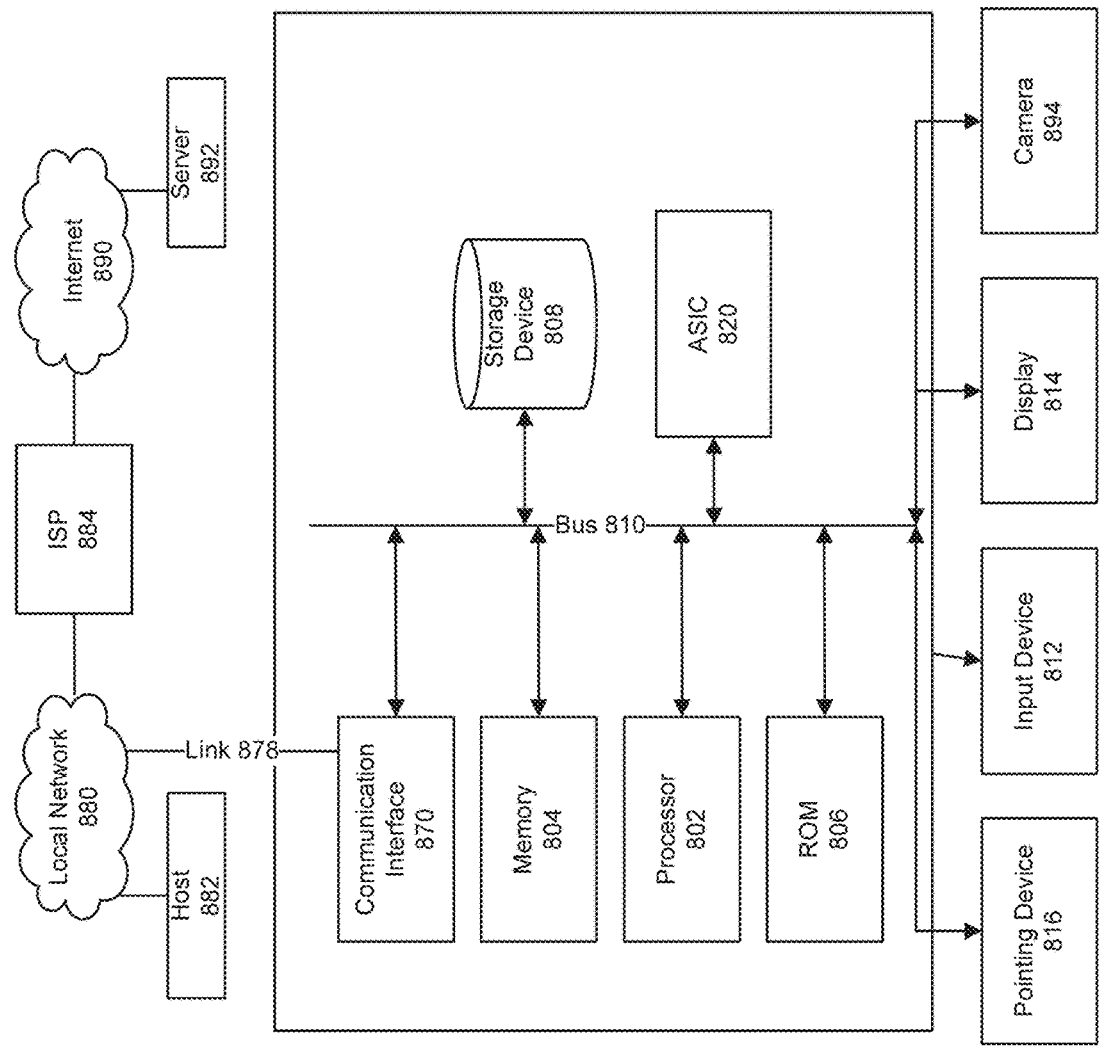
FIG. 8 illustrates a computing system upon embodiments of the disclosure may be implemented.

FIG. 8 illustrates a computing system upon embodiments of the disclosure may be implemented. Computing system 800 may be programmed (e.g., via computer program code or instructions) to provide enhanced safety to drivers using driver behavior (such as distraction) detection as described herein and includes a communication mechanism such as a bus 810 for passing information between other internal and external components of the computer system 800. In one embodiment, the computer system 800 is system 100 of FIG. 1A. Computer system 800, or a portion thereof, constitutes a means for performing one or more steps for providing enhanced safety to drivers using the driver distraction detection.

A bus 810 includes one or more parallel conductors of information so that information is transferred quickly among devices coupled to the bus 810. One or more processors 802 for processing information are coupled with the bus 810.

One or more processors 802 performs a set of operations on information (or data) as specified by computer program code related to for provide enhanced safety to drivers using driver distraction detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 810. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions.

Computer system 800 also includes a memory 804 coupled to bus 810. The memory 804, such as a random access memory (RAM) or any other dynamic storage device, stores information including processor instructions for providing enhanced safety to drivers using driver distraction detection. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information. Also coupled to bus 810 is a non-volatile (persistent) storage device 808, such as a magnetic disk, optical disk or flash card, for storing information, including instructions.

In one embodiment, information, including instructions for providing enhanced safety to distracted drivers using the head pose and gaze estimator, is provided to the bus 810 for use by the processor from an external input device 812, such as a keyboard operated by a human user, a microphone, an Infrared (IR) remote control, a joystick, a game pad, a stylus pen, a touch screen, head mounted display or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814 for presenting text or images, and a pointing device 816, such as a mouse, a trackball, cursor direction keys, or a motion sensor, for controlling a position of a small cursor image presented on the display 814 and issuing commands associated with graphical elements presented on the display 814, and one or more camera sensors 884 for capturing, recording and causing to store one or more still and/or moving images (e.g., videos, movies, etc.) which also may comprise audio recordings.

In the illustrated embodiment, special purpose hardware, such as an application specific integrated circuit (ASIC) 820, is coupled to bus 810. The special purpose hardware is configured to perform operations not performed by processor 802 quickly enough for special purposes.

Computer system 800 also includes a communications interface 870 coupled to bus 810. Communication interface 870 provides a one-way or two-way communication coupling to a variety of external devices that operate with their own processors. In general the coupling is with a network link 878 that is connected to a local network 880 to which a variety of external devices, such as a server or database, may be connected. Alternatively, link 878 may connect directly to an Internet service provider (ISP) 884 or to network 890, such as the Internet. The network link 878 may be wired or wireless. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends and/or receives electrical, acoustic or electromagnetic signals, including infrared and optical signals, which carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to a communication network for providing enhanced safety to distracted drivers using the head pose and gaze estimator to mobile devices, such as mobile phones or tablets.

Network link 878 typically provides information using transmission media through one or more networks to other devices that use or process the information. For example, network link 878 may provide a connection through local network 880 to a host computer 882 or to equipment 884 operated by an ISP. ISP equipment 884 in turn provide data communication services through the public, world-wide packet-switching communication network of networks now commonly referred to as the Internet 890.

A computer called a server host 882 connected to the Internet hosts a process that provides a service in response to information received over the Internet. For example, server host 882 hosts a process that provides information representing video data for presentation at display 814. It is contemplated that the components of system 800 can be deployed in various configurations within other computer systems, e.g., host 882 and server 882.

At least some embodiments of the disclosure are related to the use of computer system 800 for implementing some or all of the techniques described herein. According to one embodiment of the disclosure, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for monitoring driver attentiveness in a vehicle, comprising:
    collecting vehicle data and scene information from the vehicle while traveling on a route;
    capturing a gaze of a driver to track a gaze direction and a duration of the driver while driving the vehicle on the route;
    generating a reference heat map from the scene information and the vehicle data using a convolutional neural network (CNN) that comprises one or more convolutional layers and at least one fully-connected layer, the reference heat map identifying one or more regions in the scene information requiring driver attention for safe driving;
    generating a driver gaze heat map based on the gaze direction and the duration of the driver while driving the vehicle using the CNN, the driver gaze heat map identifying one or more zones in the scene information viewed by the driver during the duration;
    encoding, by a first subnetwork of a deep learning network, the reference heat map to generate a feature vector R:
    encoding, by a second subnetwork of the deep learning network, the driver gaze heat map to generate a feature vector G;
    determining a level of driver distraction of the driver in the vehicle based on a distance between the feature vector R and the feature vector G;
    merging the feature vector R and the feature vector G to form a driver attention heat map, wherein the deep learning network determines whether the level of driver distraction meets or exceeds a threshold attentiveness level based on the driver attention heat map and generates driver attention results; and
    outputting a recommendation to the driver of the vehicle according to the driver attention results.

2. The computer-implemented method of claim 1, wherein tracking the gaze direction and the duration comprises:
    capturing, by one or more sensors, a sequence of images of the driver over the duration;
    estimating the gaze direction of the driver based on the gaze extracted from the sequence of images; and
    applying the gaze direction to overlay the scene information to form the driver gaze heat map.

3. The computer-implemented method of claim 1, wherein collecting the vehicle data includes recording a position of the vehicle during driving on the route and retrieving historical vehicle data from a database that is representative of the vehicle data over a predetermined period, and wherein collecting the scene information includes obtaining street images in real-time from one or more sensors or an online map.

4. The computer-implemented method of claim 1, wherein the vehicle data includes at least one of vehicle speed data, turn indication data, light condition data, brake usage data, steering wheel usage data, global positioning system (GPS) data, gas pedal usage data, and navigation route data; and wherein the scene information includes at least one of scene images, online street maps, radar maps, weather, traffic and road conditions.

5. The computer-implemented method of claim 1, wherein, when the threshold attentiveness level is met or exceeded, the recommendation is a warning to focus the gaze direction of the driver on one or more regions of the driver gaze heat map based on values associated with each of the one or more regions, where the values represent a level of attention required by the driver for each of the one or more regions.

6. The computer-implemented method of claim 1, wherein one or more processors are located in the vehicle or communicatively coupled to the vehicle.

7. A system for monitoring driver attentiveness in a vehicle, comprising: one or more vehicle sensors configured to:
  collect vehicle data and collect scene information from the vehicle while traveling on a route;
  capture a gaze of a driver to track a gaze direction and a duration of the driver while driving the vehicle on the route; and
  one or more processors configured to:
  generate a reference heat map from the scene information and the vehicle data using a convolutional neural network (CNN) comprising one or more convolutional layers and at least one fully-connected layer, the reference heat map identifying one or more regions in the scene information requiring driver attention for safe driving;
  generate a driver gaze heat map based on the gaze direction and the duration of the driver while driving the vehicle using the CNN, the driver gaze heat map identifying one or more zones in the scene information viewed by the driver during the duration;
  encode, by a first subnetwork of a deep learning network, the reference heat map to generate a feature vector R;
  encode, by a second subnetwork of the deep learning network, the driver gaze heat map to generate a feature vector G;
  determine a level of driver distraction of the driver in the vehicle is based on a distance between the feature vector R and the feature vector G;
  merge the feature vector R and the feature vector G to form a driver attention heat map, wherein the deep learning network determines whether the level of driver distraction meets or exceeds a threshold attentiveness level based on the driver attention heat map and generates driver attention results; and
  output a recommendation to the driver of the vehicle according to the driver attention results.

8. The system of claim 7, wherein tracking the gaze direction and the duration comprises:
  capturing, by the one or more vehicle sensors, a sequence of images of the driver over the duration;
  estimating the gaze direction of the driver based on the gaze extracted from the sequence of images; and
  applying the gaze direction to overlay the scene information to form the driver gaze heat map.

9. The system of claim 7, wherein collecting the vehicle data includes recording a position of the vehicle during driving on the route and retrieving historical vehicle data from a database that is representative of the vehicle data over a predetermined period, and wherein collecting the scene information includes obtaining street images in real-time from the one or more vehicle sensors or from an online map.

10. The system of claim 7, wherein the vehicle data includes at least one of vehicle speed data, turn indication data, light condition data, brake usage data, steering wheel usage data, global positioning system (GPS) data, gas pedal usage data, and navigation route data, and wherein the scene information includes at least one of scene images, online street maps, radar maps, weather, traffic and road conditions.

11. The system of claim 7, wherein, when the threshold attentiveness level is met or exceeded, the recommendation is a warning to focus the gaze direction of the driver on one or more regions of the driver gaze heat map based on values associated with each of the one or more regions, wherein the values represent a level of attention required by the driver for each of the one or more regions.

12. The system of claim 7, wherein the one or more processors are located in the vehicle or communicatively coupled to the vehicle.

13. A non-transitory computer-readable medium storing computer instructions for monitoring driver attentiveness in a vehicle, that when executed by one or more processors, cause the one or more processors to perform the steps of:
  collecting vehicle data and scene information from the vehicle while traveling on a route;
  capturing a gaze of a driver to track a gaze direction and a duration of the driver while driving the vehicle on the route;
  generating a reference heat map from the scene information and the vehicle data using a convolutional neural network (CNN) that comprises one or more convolutional layers and at least one fully-connected layer, the reference heat map identifying one or more regions in the scene information requiring driver attention for safe driving;
  generating a driver gaze heat map based on the gaze direction and the duration of the driver while driving the vehicle using the CNN, the driver gaze heat map identifying one or more zones in the scene information viewed by the driver during the duration;
  encoding, by a first subnetwork of a deep learning network, the reference heat map to generate a feature vector R:
  encoding, by a second subnetwork of the deep learning network, the driver gaze heat map to generate a feature vector G;
  determine a level of driver distraction of the driver in the vehicle based on a distance between the feature vector R and the feature vector G;
  merging the feature vector R and the feature vector G to form a driver attention heat map, wherein the deep learning network determines whether the level of driver distraction meets or exceeds a threshold attentiveness level based on the driver attention heat map and generates driver attention results; and
  outputting a recommendation to the driver of the vehicle according to the driver attention results.

14. The non-transitory computer-readable medium of claim 13, wherein tracking the gaze direction and the duration comprises:
capturing, by one or more sensors, a sequence of images of the driver over the duration;
estimating the gaze direction of the driver based on the gaze extracted from the sequence of images; and
applying the gaze direction to overlay the scene information to form the driver gaze heat map.

15. The non-transitory computer-readable medium of claim 13, wherein collecting the vehicle data includes recording a position of the vehicle during driving on the route and retrieving historical vehicle data from a database that is representative of the vehicle data over a predetermined period, and wherein collecting the scene information includes obtaining street images in real-time from one or more sensors.

16. The non-transitory computer-readable medium of claim 13, wherein the vehicle data includes at least one of vehicle speed data, turn indication data, light condition data, brake usage data, steering wheel usage data, global positioning system (GPS) data, gas pedal usage data, and navigation route data; and wherein the scene information includes at least one of scene images, online street maps, radar maps, weather, traffic and road conditions.

17. The non-transitory computer-readable medium of claim 13, wherein, when the threshold attentiveness level is met or exceeded, the recommendation is a warning to focus the gaze direction of the driver on one or more regions of the driver gaze heat map based on values associated with each of the one or more regions, wherein the values represent a level of attention required by the driver for each of the one or more regions.

18. The non-transitory computer-readable medium of claim 13, wherein the one or more processors are located in the vehicle or communicatively coupled to the vehicle.

* * * * *